Patented July 26, 1932

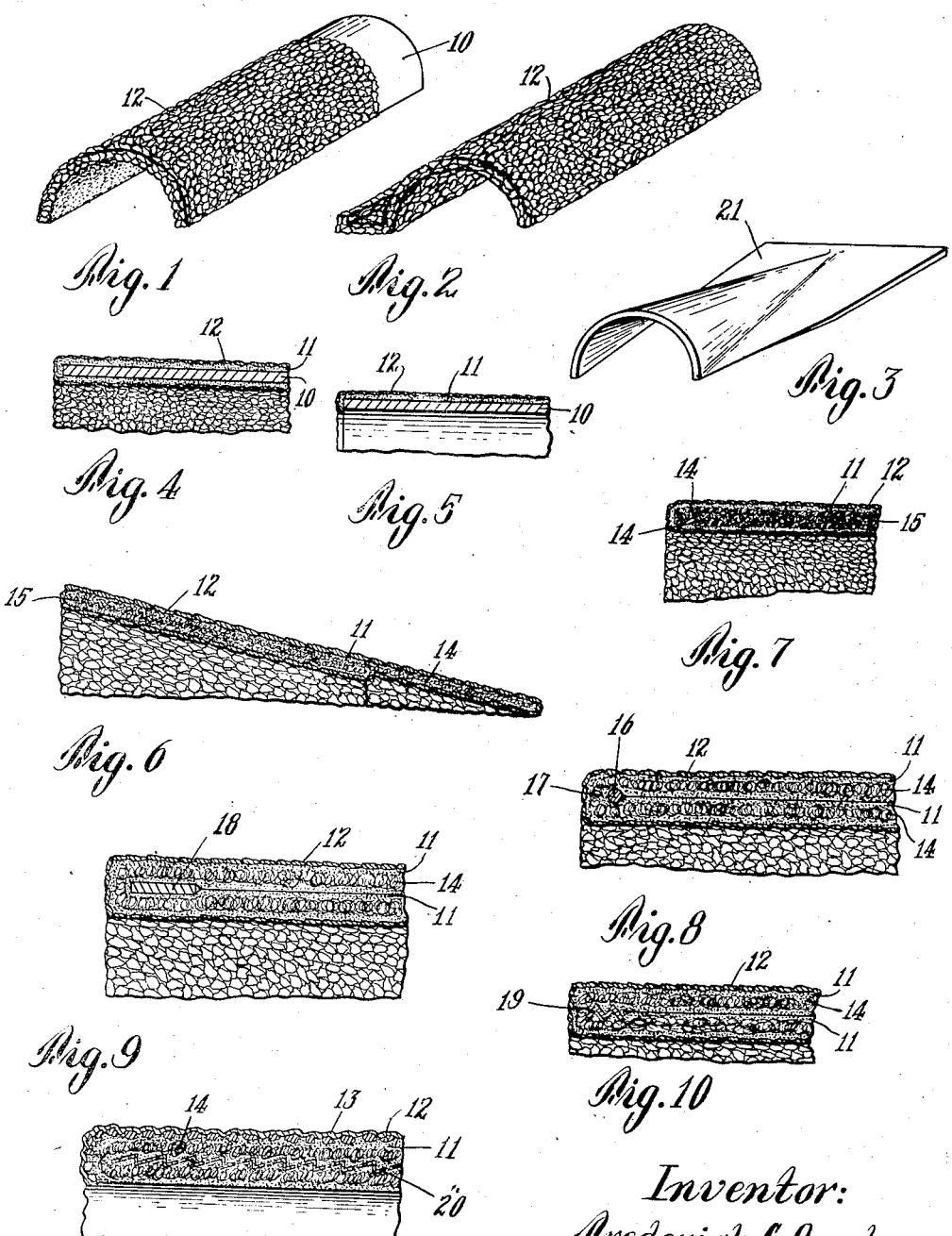

1,868,803

UNITED STATES PATENT OFFICE

FREDERICK C. OVERBURY, OF HILLSDALE, NEW JERSEY, ASSIGNOR, BY MESNE ASSIGNMENTS, TO THE PATENT AND LICENSING CORPORATION, OF BOSTON, MASSACHUSETTS, A CORPORATION OF MASSACHUSETTS

ROOFING TILE

Application filed June 1, 1926. Serial No. 112,815.

This invention relates to fabricated roofing elements which are generally tile-shaped and are wholly or partly rigid to retain their shape. Manufactured roofing products of the present day, which are made of flexible base material, have the disadvantage of a monotonous and thin or unsubstantial appearance when laid on a roof so that they compare unfavorably in this respect with the more massive appearing products of clay or cement. The latter, however, are more or less permeable to moisture so that when laying them it is customary to supply an under course of ordinary "prepared" roofing in order that water may not penetrate the final structure. It is thus an object of my invention to provide impervious roofing elements with an upstanding and comparatively massive or substantial structure by combining the properties of various substances used in the manufacture of the elements so as to impart to the finished product rigidity in whole or in part, and imperviousness to water and other effects of the weather. It is also an object of the invention to control the surface coloring of the elements.

My invention embraces the manufacture of elements from a wide variety of basic materials. These include materials capable of forming a rigid base, such as moldable compositions containing Portland cement with a suitable mineral aggregate, magnesite or gypsum with a suitable filler, or any equivalents of these which may be molded or formed into desired shapes and allowed to set into a rigid structure.

Another type of base material, which is capable of being molded or formed into desired shapes in a mold or press, comprises mixtures of asphalt emulsion with one or more of such fillers as rag or asbestos fiber, sawdust, kieselguhr, comminuted cork or equivalent materials. The asphalt emulsion may be prepared as decribed in Patent No. 1,417,835 to Kirschbraun, and the composition may be molded, extruded, pressed, or otherwise formed into desired shapes by suitable mechanisms, after which the product may be allowed to cure and dry with or without artificial heat. A molded base of this character has the advantage of having incorporated with it a waterproof constituent, and of being slightly flexible, and capable of withstanding a considerable shock, yet being sufficiently rigid to maintain any desired configuration.

My improved roofing tiles may also have a base made of sheet material, such as "roofing felt" which is well known in the art. Such felt may be formed on a paper-making machine of pulp comprising one or more kinds of fiber, such as rag or asbestos. Sheets of felted fibrous material made in this way are usually saturated with a waterproofing composition such as liquefied asphalt or the like. Pieces may be cut from such sheets and pressed or molded to shape, either in a single layer or a plurality of superposed layers. When material of this kind is used, stiffening members must be applied or incorporated since roofing felt ordinarily has not sufficient inherent rigidity to maintain an upstanding shape. Stiffening members may be introduced in any desired manner to impart comparative rigidity to a part or the whole of the molded elements, and may be in the form of wires or bands adjacent to the butt edge of the elements for local stiffness in the portion of the elements which is exposed when laid, or they may extend through the whole element to impart rigidly to the entire extent thereof. In building up a base of layers of roofing felt, a plurality of pieces may be put together or a single layer may be folded up underneath, the folded portion extending part way or all the way toward the head of the element. Thus the unexposed element may be a single layer in thickness while the exposed portion may comprise any desired number of layers. In assembling such an element base, the various layers may be placed together in sheet form with reinforcing or stiffening members placed as desired, preferably between the sheets. The stock thus formed may be cut and pressed to shape.

However the base be made up, whether of molded inherently rigid material or of stiffened flexible material, it is made up into a finished element by coating all or part of its surface with a layer of impervious material such as "blown" asphalt, or its equivalent, which while hot and sticky is surfaced with a protective layer of comminuted slate, tile, brick, or the like, which may be of any desired color. Where the elements are built up from sheet material, the coatings of asphalt and grit may be applied to the composite sheet before the separate elements are cut therefrom and shaped, but it is preferable to apply the finishing coatings after the stock has been cut and shaped so that the edges as well as the faces of the elements will be protected.

Additional thickness and a greater range of colors may be obtained by subjecting the coated elements to a spray of hydraulic cement which may be mixed with any suitable pigment. The cement thus applied covers the comminuted material adhering to the surface of the element and partly fills the interstices between the particles. In elements of this type, the comminuted material may comprise the mineral materials hereinbefore mentioned, or granulated cork, sawdust, or mixtures of such materials.

Various embodiments of my invention are illustrated on the drawing, of which,—

Figures 1, 2 and 3 are perspective views of representative shapes of tiling.

Figures 4 and 5 are fragmentary cross sections of the butt portion of tiles having a base of rigid material.

Figure 6 is a section on the longitudinal median of a tile similar to that shown in Figure 3.

Figures 7, 8, 9, 10 and 11 are fragmentary sections of the butt portions of laminated tiles showing various forms of stiffening elements.

Referring to the drawing in detail, Figure 1 represents a roofing element formed in a conventional tile shape, this element being constructed of a base 10 of rigid material, such as clay, Portland cement, gypsum, or the like, mixed with other suitable fillers or materials and treated in such a way as to render them rigid. A tile made from such materials alone is more or less pervious to moisture, hence for complete protection to the roof which is to be covered by such elements, each element is covered wholly or over its exposed portion with a coating 11 of impervious material which thoroughly protects both the tile itself and the roof beneath it from the entrance of moisture. This coating may be of any suitable substance, such as for example blown asphalt, which by reason of its high melting point and its tough rubbery consistency is a preferred material for this purpose. Figure 1 illustrates an element which has been coated over the butt portion of its exterior or upper surface, the butt edge also being covered as shown in Figure 5. In this example, the head portion which is lapped and protected by the course of elements laid above it on the roof is left uncoated as is also the under surface of the element. Figure 2 illustrates an element which has been completely coated on all of its surfaces and edges, a section of this form being illustrated in Figure 4. In both cases, while the coating is still hot and sticky, comminuted material of any desired kind may be applied to the coated areas, enough of this material being partially embedded in the sticky coating to adhere thereto and to form a surfacing layer 12 substantially covering the asphalt coating and protecting it from the deteriorating action of the weather. By selecting comminuted or granular material of any desired color, the color of the finished tile may be readily controlled. Any suitable material may be used for this surfacing layer, such as crushed slate, or vitreous material of any kind, or where a further coating is to be applied, granulated cork, or sawdust, or the like, may be used to add extra thickness or bulk to the element without excessive weight. As shown in Figure 11, a thin layer 13 of hydraulic cement mixture may be applied as by a cement gun or sprayer to cover the layer 12 of comminuted material. This cement may be mixed with any desired pigment to control the color of the finished element. As indicated in Figure 11, the cement when applied will enter the voids or interstices between the granules of the layer 12 and will afford an additional continuous protective coating to the element. The element may be flat or take the shape of any of the various tile or shingle slabs now on the market.

Instead of constructing the tile with a base of rigid material throughout its extent, I may make the base of flexible sheet material such as is ordinarily used in fabricated roofing of this type and is commonly known as "roofing felt." Since roofing felt is comparatively thin, I prefer to use a plurality of layers thereof in the butt or exposed portion of the roofing tile. In order to maintain the upstanding shape of the roofing element, I combine with the laminæ of roofing felt a stiffening or shape-retaining member which may extend through the entire element or may be confined to the butt portion thereof. This stiffening member may be of any desired material, such as metal, wicker, or the like, and may be in the shape of single wires or strips, woven net, expanded sheet, or equivalent forms. Figure 7 illustrates one form of laminated structure having two sheets 14 of felt with a woven stiffening member 15 positioned between them, the structure thus built up being surfaced with an impervious coating 11 on the inner and outer surfaces and edges and a layer 12 of granular material covering the coating and adhering thereto. In this case, the woven stiffening member 15 may extend from the butt to the head of the shingle, or I may use a narrow strip thereof positioned adjacent to the butt edge extending from one side edge of the element to the other side edge. In Figure 6 the stiffening element 15 is shown as extending from the butt edge about half way toward the head of the element. Other forms of stiffening elements are illustrated in Figure 8 in which a wire or rod 16 of metal or wicker or the like is shown embedded between the layers of felt which are folded as at 17, the line of fold forming the butt edge of the element. In Figure 9, a flat bar 18 is shown, in Figure 10 a narrow strip 19 of corrugated metal, and in Figure 11 a sheet 20 of expanded metal.

Where the elements are made up of flexible roofing felt with a reinforcing or stiffening member associated with the butt portion, the head portion will be relatively limp and flat as shown at 21 in Figure 3. By such a construction the shape-retaining stiffening member positioned in the butt portion of the element will preserve the upstanding tile shape in the portion exposed when the element is laid on a roof, the remaining portion of the element being flattened out and thus in a form to facilitate nailing or otherwise securing the element to the roof.

In making up the laminated elements from sheets of felted fibrous roofing stock, pieces of suitable size and shape may be cut from the sheet and put together in superposed position with a stiffening member located as desired. The structure thus built up may then be dipped or otherwise coated over its entire surface or over its exposed surface and edges with or without further layers of grit and liquid cement as desired. Instead of separate layers of felt being associated together, the pieces cut from the sheet may be made large enough to fold a portion thereof back on themselves as indicated in Figure 6, the line of fold being along the butt edge of the finished element. Whether separate sheets are used as laminæ, or a single sheet is folded back on itself, or the two methods are combined by folding a sheet back on itself with another layer added thereto inside or outside of the fold, the additional layers thus applied may extend from the butt to the head of the shingle, or as shown in Figure 6 may be substantially coextensive with the butt portion of the elements, leaving a single layer of felt for the head portion. An asphaltic cement or its equivalent may be used to hold the laminæ of an element together, with or without the addition of fastening devices extending through the layers. This type of construction produces an element which has a very substantial and massive appearance without excessive weight since the head portion which is lapped by the course above is substantially thin. The laminated structure may be built up by a continuous process, if desired, by leading together strips of sheet roofing felt of indeterminate length and suitable width with a wire or other stiffening element of indeterminate length. Or a wider strip of felt may be progressively folded, enclosing the stiffening member within the fold. These two methods may be combined by both folding a strip and at the same time progressively associating therewith additional strip or strips of felt together with a stiffening element. The laminated structure thus progressively built up is then cut into elements with cuts across the strip intersecting the line of fold, the latter becoming the butt edge of the elements.

It will be obvious that the forms of structure illustrated on the drawing are illustrative only and that many other variations and modifications may be made. I do not wish to be limited therefore in the scope of my invention except as is defined by the appended claims.

I claim:

1. A tile-shaped roofing element comprising a flexible head portion formed of a single layer of roofing felt, an upstanding butt portion made up of a plurality of layers of roofing felt, a shape-retaining member between certain of said layers for holding said butt portion in upstanding position and confined to the butt portion whereby it does not interfere with the flexibility of said head portion, and a continuous coating of impervious material covering the exposed surface and edges of said element.

2. A roofing element comprising a flexible head portion formed of a single layer of roofing felt, a butt portion made up of a plurality of layers of roofing felt and shaped substantially in the form of a cylinder sector, a shape-retaining member between certain of said layers and confined to said butt portion whereby it does not interfere with the flexibility of said head portion, and a continuous coating of impervious material covering the exposed surface and edges of said element.

In testimony whereof I have affixed my signature.

FREDERICK C. OVERBURY.